(12) United States Patent
Wunderlich et al.

(10) Patent No.: US 7,434,611 B2
(45) Date of Patent: Oct. 14, 2008

(54) ROOF MODULE

(75) Inventors: Christian Wunderlich, Chemnitz (DE); Michael Stelter, Chemnitz (DE)

(73) Assignee: Webasto AG, Stockdorf (DE)

( * ) Notice: Subject to any disclaimer, the term of this patent is extended or adjusted under 35 U.S.C. 154(b) by 0 days.

(21) Appl. No.: 10/947,223

(22) Filed: Sep. 23, 2004

(65) Prior Publication Data

US 2005/0092005 A1    May 5, 2005

(30) Foreign Application Priority Data

Oct. 28, 2003   (DE) ................. 103 50 177

(51) Int. Cl.
*B60H 1/00* (2006.01)
(52) U.S. Cl. ............ 165/202; 165/42; 165/43; 237/12.3 B; 237/12.3 A; 429/26; 62/323.1; 62/234; 62/239; 62/244
(58) Field of Classification Search .......... 165/202, 165/42, 43; 237/12.3 B, 12.3 A; 429/26; 62/323.1, 234, 239
See application file for complete search history.

(56) References Cited

U.S. PATENT DOCUMENTS

| | | | | |
|---|---|---|---|---|
| 2,869,333 A | * | 1/1959 | Hoiby et al. ............... | 62/239 |
| 3,315,488 A | * | 4/1967 | Lind ......................... | 62/241 |
| 4,217,764 A | * | 8/1980 | Armbruster ............... | 62/323.1 |
| 6,423,894 B1 | * | 7/2002 | Patz et al. ................. | 136/244 |
| 6,445,080 B1 | * | 9/2002 | Daqoa et al. .............. | 307/9.1 |
| 6,448,535 B1 | * | 9/2002 | Ap ............................ | 219/208 |
| 6,777,115 B2 | * | 8/2004 | Reiser ....................... | 429/13 |
| 2004/0020228 A1 | * | 2/2004 | Waldschmidt et al. .... | 62/234 |

FOREIGN PATENT DOCUMENTS

| | | | |
|---|---|---|---|
| DE | 198 53 767 | | 1/2000 |
| DE | 19927518 A1 | * | 1/2001 |
| EP | 1057668 A2 | * | 12/2000 |
| JP | 05260612 A | * | 10/1993 |
| JP | 11227548 A | * | 8/1999 |
| JP | 2000149974 A | * | 5/2000 |

OTHER PUBLICATIONS

Machine Translation of JP 2000-149974 (May 30, 2000).*

* cited by examiner

*Primary Examiner*—John K Ford
(74) *Attorney, Agent, or Firm*—David S. Safran

(57) ABSTRACT

A roof module (10) for a motor vehicle, with an integrated climate control system (12, 14, 16, 18). Furthermore, the roof module (10) includes a fuel cell system (32, 34, 38). The roof module (10) is preferably a pre-mounted complete motor vehicle roof with bordering modules, preferably with extra integrated functions.

9 Claims, 2 Drawing Sheets

ROOF MODULE

BACKGROUND OF THE INVENTION

1. Filed of the Invention

The invention relates to a roof module for a motor vehicle, with an integrated climate control system.

2. Description of Related Art

A roof module of the initially mentioned type is known, for example, from German Patent DE 198 53 767 C1.

Roof modules for the purpose of the invention are especially pre-mounted complete motor vehicle roofs with bordering modules which can be mounted complete on the motor vehicle or can be exchanged. Furthermore, the concept of a roof module in this connection includes modules which are designed to be mounted on motor vehicle roofs, both within the context of motor vehicle production and also within the context of retrofitting. In any case, it is preferred that the roof module has extra integrated functions.

Known climate control systems for motor vehicles typically comprise an evaporator with an assigned expansion element, a condenser and a compressor. For example, in conjunction with passenger cars, vans or small trucks, such as pickups, integrating the climate control system into the vehicle ventilation is known, the compressor conventionally being driven mechanically by the engine of the motor vehicle. So-called roof-mounted climate control systems are used especially for additional cooling of minibuses or transport vehicles, the compressor in these roof-mounted climate control systems often being electrically driven, i.e., are not mechanically coupled to the engine.

For (supplementary) vehicle power supply, the use of a so-called APU (auxiliary power unit) based on fuel cells is being increasingly considered, especially to be able to carry out vehicle climate control without difficulty even in stationary operation and to make available higher electric power independently of the engine. In this connection, for example, so-called SOFC fuel cells can be used and can be combined with a simple reformer. In this case, the fuel cell system can be operated with the liquid fuels available in the vehicle, such as diesel or gasoline. Furthermore, so-called PEN fuel cells are known which are likewise suited for power generation and which work on the basis of hydrogen. The hydrogen can be carried onboard the vehicle or can be produced from other fuels, such as methanol, by means of a reformer.

SUMMARY OF THE INVENTION

A primary object of the present invention is to develop the generic roof modules such that its functionality is improved.

This object is achieved by the roof module for a motor vehicle being provided with an integrated climate control system and a fuel cell system.

The roof module in accordance with the invention is based on the generic roof module mentioned above into which a fuel cell system has been integrated. This approach enables, for example, stationary climate control which is independent of the engine for a long time interval, and preferably, at the same time, additional electrical energy can be supplied. The arrangement of the fuel cell system in the roof module also saves valuable space, for example, in the engine compartment since components of the fuel cell system or APU need not be housed there. This makes it possible to also equip vehicles with an APU which are not designed for this purpose based on the actual vehicle concept.

With a suitable execution of the roof module of the invention, the same components of the system can be used for heating and cooling the interior, in many cases without the need for intervening in the cooling system of the vehicle engine. Chemical fuels for the fuel cell system can be gasoline, diesel or burnable gas from the already present vehicle tank, provided that the fuel cell system is designed for it. This applies especially to SOFC fuel cells, In this case, the integration of the roof module is especially simple and convenient since only one fuel need be carried in the tank and to operate the roof module only one additional fuel delivery means from the fuel tank is necessary. A separate fuel tank for the fuel cell system in the roof module is also possible, it also being possible to resort to other chemical energy sources in the motor vehicle. For example, in trailers and motor homes, the other chemical energy sources can be a liquefied gas system.

The roof module in accordance with the invention can be advantageously developed in that it also comprises one or more of the following components:
- a storage for chemical fuels,
- a delivery means for chemical fuels,
- an electrical energy storage mechanism,
- an electrical converter,
- a solar cell module,
- a ventilation component,
- a power supply output,
- an illumination means,
- an additional heat exchanger,
- a heater,
- an electrically operated comfort function.

The storage for chemical fuels can be, for example, a hydrogen storage, and in this case the use of a reformer can be eliminated. Of course, other chemical fuels can also be contained in the storage, for example, methanol, gasoline, diesel fuel, and so forth.

The delivery means for chemical fuels can be especially a pump.

The electrical energy storage mechanism is preferably formed by a battery.

The electrical converter can be used especially to transform the voltage which has been delivered by the fuel cell system into some suitable DC and/or AC voltage. In this connection, especially conventional voltages such as, for example, 12 V, 24 V, 110 V and/or 220 V are possible.

The solar cell module can, without being limited thereto, be designed to operate the roof module of the invention independently of the battery which is assigned to the engine. For example, the electrical energy storage mechanism of the roof module can be charged via the solar cell module so that the energy required for starting the fuel cell system is available in the roof module itself.

The concept of a ventilation component in this connection should be widely interpreted and comprises, for example, closable roof openings, air conduction means, discharge nozzles, controls and so forth.

The power supply output, without being limited thereto, can be for example one or more receptacles which are accessible from the interior of the motor vehicle in order to supply any devices which are operated with electrical energy.

The illumination means can be assigned to the vehicle interior and/or the vehicle exterior. The illumination means assigned to the vehicle exterior can be, for example, side marker lamp illumination while the illumination means assigned to the vehicle interior can be formed, for example, by a reading lamp, a vanity mirror illumination, or general interior illumination.

The additional heat exchanger is a heat exchanger which is not absolutely essential for operation of the climate control system and which can be designed, for example, to transfer the process heat produced by the fuel cell system to a heating circuit.

The heater can be both an electrical heater and also a fuel-fired heater. In any case, it is preferred that the heater be designed for stationary heating operation.

The designation electrically operated comfort function is intended to define all means which increase the comfort of the passengers in some way. In this connection, for example, audio devices, video devices, communications devices, data processing devices, but also a refrigerator and the like are possible.

It is clear that of the above explained components, there can also be more than one component.

In connection with the roof module as claimed in the invention, it is furthermore preferred that it has at least one or more of the following interfaces:
an electrical interface,
a control interface,
an interface for chemical fuels,
an interface for a cooling and/or heating circuit,
a exhaust gas interface.

The concept of electrical interface is intended to encompass especially interfaces which are suited for supplying electrical energy to the electrical roof module, for example, from the battery which is assigned to the engine, and also interfaces which are intended to tap electrical energy from the roof module, for example, to supply vehicle components which are not assigned to the roof module with electrical energy.

Control interfaces can be especially interfaces to sensors and/or controls with which the operation of the components assigned to the roof module can be influenced.

The interface for chemical fuels is, for example, a connection to a fuel line which is connected to the fuel tank of the vehicle.

The interface for a cooling and/or heating circuit can be designed both to supply the cold and/or heat produced by the vehicle to the roof module, and vice versa.

The exhaust gas interface is especially a connection to any exhaust gas line.

In connection with the above explained interfaces it is also clear that more than one of the corresponding interfaces can be present at one time.

In the above explained connection, it is preferred that there is at least one interface in the area of the A, B, and/or C pillar. This approach is especially advantageous if the roof module of the invention is attached directly to the corresponding columns or if the roof module itself comprises the corresponding columns.

For all embodiments of the roof module in accordance with the invention, it is preferred that it is made double-bottomed at least in sections. The concept "double-bottomed" in this connection should be broadly interpreted and is intended to also encompass embodiments in which, for example, a hood is placed on a base plate on which the components of the roof module are located.

In connection with the roof module according to the invention, it can also be provided that it forms a motor vehicle roof in its entirety or in part. The roof module can be optionally mounted, for example, instead of a simple roof. In any case, it is preferred that the roof module on the media side is incorporated strictly into the vehicle concept both structurally and in terms of flow dynamics.

However, embodiments of the roof module of the invention are also possible in which it is provided that it is designed for installation on a motor vehicle roof. This approach is especially suited in conjunction with so-called after-market solutions or retrofitting of motor vehicles.

The roof module according to the invention can be advantageously developed in that the climate control system can be operated as a heat pump. The use of the climate control system as a heat pump is possible, for example, when $CO_2$ is used as the refrigerant. If the climate control system can be operated as a heat pump, it can, for example, replace conventional auxiliary heating and can very quickly heat up the vehicle interior, in many case the same air conduction elements as for cooling can be used.

One likewise preferred development of the invention calls for the climate control system to be an electrically operated climate control system which is supplied by the fuel cell system. Since the fuel cell system generally works independently of the vehicle engine, it can maintain the operation of the climate control system and also all other comfort functions even in stationary operation. The length of operation in this case is dependent only on the capacity of the chemical fuels. They have a much higher energy density than all known electrical energy storage mechanisms and can, moreover, be added independently of the electrical system.

In especially preferred embodiments of the roof module of the invention, it is provided that the heat produced by the fuel cell system can be used for heating of the motor vehicle. For example, in the case of SOFC fuel cell systems the SOFC cells themselves and the reformer as well as the afterburner which is generally necessary constitute a heat source. Cooling of these components takes place primarily with air and can also take place in a secondary manner with water. The temperature of the coolants can be very high, for example, up to 100° C. for water and several 100° C. for air. In the case of PEN fuel cell systems, the similar applies, also in this case, the PEN cells themselves and the reformer being cooled with air or water (or any other suitable heat transfer medium). In this case, the coolant temperatures are lower and are, for example, 70° C. In any case, the process heat which forms can be used to constitute the heating functions for the motor vehicle by the heat transfer media of the climate control circuit being coupled to the heat transfer media of the fuel cell system. This is promoted by the fact that the climate control system and the fuel cell system are located in the roof module adjacent to one another in space.

For all embodiments of the roof module in accordance with the invention, it is preferred that the fuel cell system is designed such that it can supply at least the components assigned to the roof module in stationary operation. Preferably, the fuel cell system is, however, so efficient that it can also supply other components of the motor vehicle and thus it completely assumes the function of an APU.

The invention will now explained, using one preferred embodiment, by way of example with reference to the accompanying drawings.

DETAILED DESCRIPTION OF THE INVENTION

Figure 1:
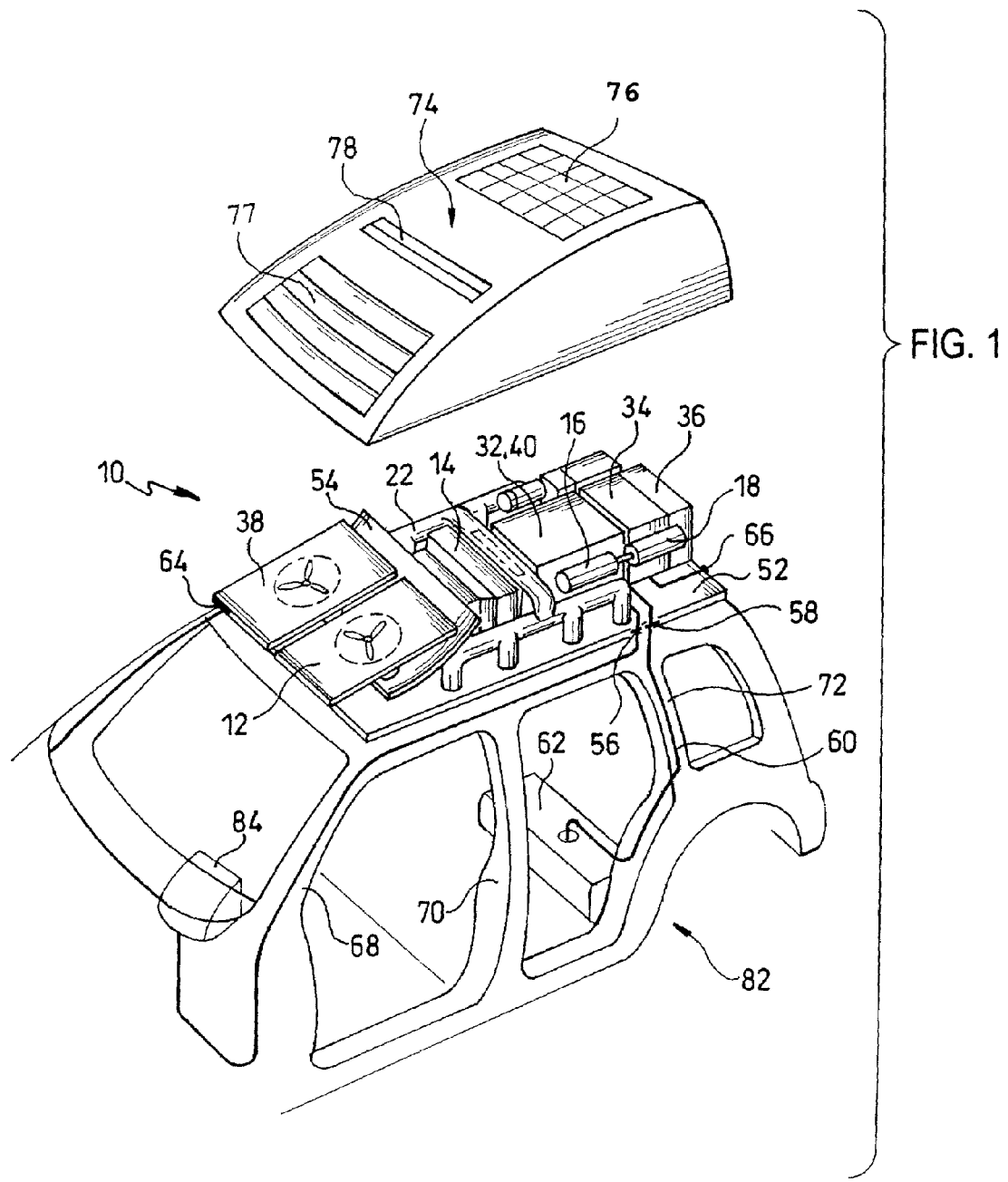
FIG. 1 is a partially exploded schematic perspective of a motor vehicle chassis on which one embodiment of the roof module of the invention is located.

FIG. 1 shows a motor vehicle chassis 82 which is equipped with a roof module 10 in accordance with the invention. FIG. 1 also shows a hood 74 which is assigned to the roof module 10 and which is not shown in FIG. 2. The hood 74 comprises a solar cell module 76 which is designed for current generation. Furthermore, the hood 74 is equipped with an air inlet 77 which, in the installed state of the hood 74, is located adjacent to the condenser 12 and the fuel cell fan 38. The air which has flowed through the condenser 12 or the fuel cell fan 38 is deflected by an air baffle 54 to an air outlet 78 which is provided in the hood 74. The illustrated roof module 10 has a climate control system, the main components of which are formed by a condenser 12, an evaporator 14, a compressor 16 and a compressor drive 18.

Furthermore, the roof module 10 has a fuel cell system which comprises, especially, a fuel cell stack 32, a reformer 34, a storage 36 and a heat exchanger 40. Air which has been conditioned at least by the climate control system 12, 14, 16, 18 is supplied to the interior of the motor vehicle via an air distribution system 22. Both the climate control system 12, 14, 16, 18 and also the fuel cell system 32, 34, 38 in the illustrated case are located on a supporting roof structure 52 so that the pre-mounted roof module 10 can be put into place as a whole in the final assembly of the vehicle.

In order to functionally incorporate the roof module 10 into the vehicle, there are several interfaces. In this case, the interface 56 forms an electrical interface and a control interface. Via the interface 56, in this case, a control unit 84 is connected via which the function of the components of the roof module 10 can be influenced. The interface 56, in the illustrated case, is provided in the area of the C-pillar 72. However, interface 56 could also be equally well located in the area of the A-pillar 68. Furthermore, an interface 58 for chemical fuels is also provided, the interface 58 being located in the area of the C-pillar and creating a connection to the fuel line 60 which, for its part, is connected to the fuel tank 62. An exhaust gas interface 66 and an interface 64 for a cooling/heating circuit are likewise provided, the latter being located in the area of the A-pillar. Of course, it would likewise be possible to place one or more of the interfaces 56, 58, 64, 66 in the area of the B-pillar 70.

Although, at present, preferably R-134a is being used as the refrigerant for climate control systems, within the framework of the invention, $CO_2$ can also be used as the refrigerant. In addition to ecological advantages (no damage to the ozone layer), $CO_2$ climate control systems have the advantage of a higher operating pressure, and thus, allow smaller compressors. Furthermore, a $CO_2$ climate control system can be operated as a heat pump; this makes it possible to very quickly heat up the vehicle interior.

Figure 2:
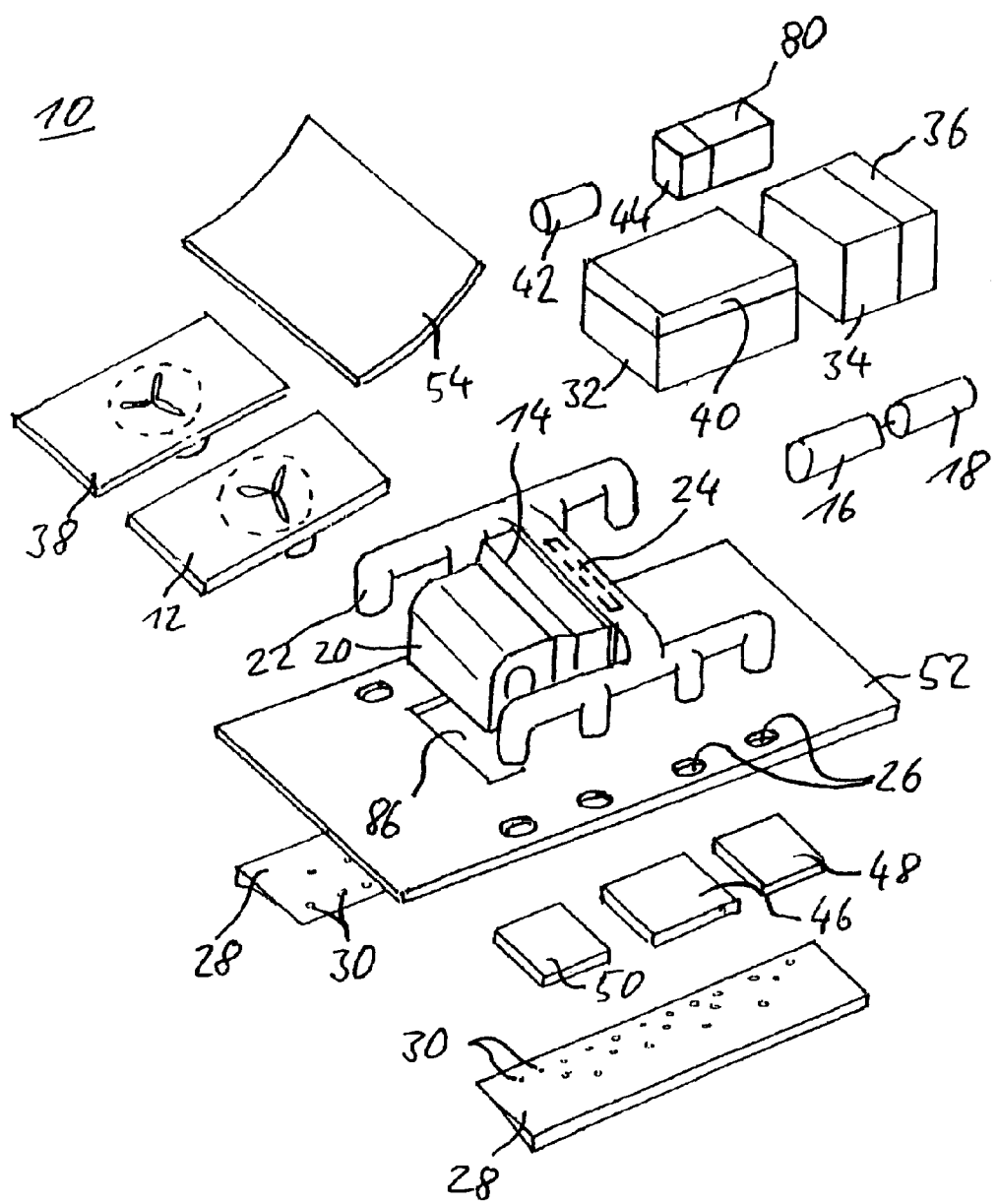
FIG. 2 is an exploded schematic perspective drawing of the roof module from FIG. 1.

FIG. 2 shows the important components of the roof module 10 in an exploded drawing. All of the components are connected directly or indirectly to the supporting roof structure 52. This roof structure 52 has openings 26 into which the end sections of the air distribution system 22 discharge, and in which there is also an electrical heater 24.

Instead of the electrical heater 24, there can of course also be other heaters, for example, fuel-fired heaters. In particular, when the climate control system can be operated as a heat pump, optionally, a separate heater can be eliminated. On the side of the supporting roof structure 52 which faces the vehicle interior, there are two air discharge elements 28 which are equipped with a host of openings or nozzles 30. In this way, the air discharge openings can be distributed over the entire motor vehicle roof; this also enables draft-free climate control of parts of the interior which are not reached by the air discharge nozzles which are conventionally provided (for example, in the dashboard). As a result of the host of nozzles 30, the air flow velocity can be furthermore reduced; this likewise increases comfort.

Furthermore, on the side of the supporting roof structure 52 facing the vehicle interior, there is a power supply output 46 in the form of one or more receptacles. Via this power supply output 46, preferably different supply voltages are made available, with which devices in the vehicle interior can be operated.

Adjacent to the power supply output 46, an illumination means 48 and a comfort function 50 are indicated, and the latter can be formed, for example, by audio, video and/or communications means.

A ventilation or circulating fan 20 produces an air flow which flows through the evaporator 14 before it is supplied to the air distribution system 22. In order to enable air circulation, the ventilation or circulating fan 20 is connected to a recess 86 in the supporting roof structure 52.

The evaporator 14 interacts with a condenser 12, a compressor 16 and an electrical compressor drive 18.

The electrical compressor drive 18 is supplied from the fuel cell system with the following primary components formed by the fuel cell stack 32, a reformer 34 and a fuel cell fan 38. As shown in FIG. 2, there are also an optional storage 36 for chemical fuels, a pump 42, a converter 44 and an electrical energy storage mechanism 80. Furthermore, an additional heat exchanger 40 is indicated via which the process heat produced by the fuel cell system can be dissipated to heat the vehicle interior.

The function of the air baffle 54 has already been explained with reference to FIG. 1.

With the embodiment of the invention described using FIGS. 1 and 2, especially the following advantages can be accomplished:

- By moving the climate control and comfort functions into the roof module 10, valuable space is saved elsewhere (for example, in the engine compartment). The invention represents a combination of known roof modules and roof-mounted climate control systems and their expansion with the new functions of stationary climate control and APU for an integrated energy roof.
- Vehicles can be flexibly equipped with comfort functions without changing already existing vehicle concepts. Retrofitting of existing vehicles is likewise possible since only the roof or parts of it need be replaced.
- With a suitable execution, the same components of the system can be used for electrical heating and cooling of the interior without the need to intervene into the cooling system of the vehicle engine. Of course, in addition or alternatively electrical heating elements can also be operated in the vehicle.
- The integration of the climate control into the vehicle roof offers the possibility of more pleasant climate control based on the possible distribution of the air discharge openings over the entire vehicle roof. Thus, parts of the interior which are not reached by conventional air discharge nozzles (for example, in the dashboard) can be climate-controlled without a draft. As already mentioned, when using a host of nozzles, the flow velocity of the air is further reduced; this is perceived as pleasant.
- The ventilation/climate control function can be shifted from the center console module into the roof module. This allows, especially in combination with electrification, much improved vehicle packaging and control concepts even if the basic principle of drive via an internal combustion engine is retained.
- All climate control and comfort functions are available in stationary operation with the engine turned off.
- It is possible to operate additional devices with standard connections, for example, 12 V or 220 V, in the vehicle without limitation of the length of operation which occurs in the prior art while driving and/or when stationary as a result of the limited capacity of the vehicle electrical system or vehicle battery.

Since fuel cell systems operate very quietly, the noise burden can be reduced, for example, in comparison to known systems with an internal combustion engine.

The features of the invention which are disclosed in the description above, in the drawings and in the claims can be significant both individually and also in any combination for implementation of the invention.

What is claimed is:

1. Roof module for a motor vehicle, comprising:
   an integrated climate control system having a condenser, an evaporator, a compressor and a compressor drive,
   a fuel cell system having a fuel cell stack, a fuel cell fan, a reformer, an electrical energy storage mechanism and a heat exchanger, and
   a hood covering the integrated climate control system and the fuel cell system;
   wherein the fuel cell fan and the condenser are located under a forward area of the hood, wherein an air intake is provided in the hood in front of the fuel cell fan and the condenser, wherein an air outlet is provided in the hood rearward of the fuel cell fan and the condenser, and wherein an air baffle is provided between the air outlet and the fuel cell fan and the condenser for deflecting air to said air outlet, and wherein a solar cell unit is incorporated into a rear surface area of the hood at a location that is spaced apart rearward from the air outlet.

2. Roof module as claimed in claim 1, in combination with a motor vehicle having a roof, wherein the module forms at least part of the vehicle roof.

3. Roof module as claimed in claim 1, wherein at least one interface is positioned to correspond to a location in the area of at least one of an A-pillar, B-pillar, and C-pillar of a motor vehicle.

4. Roof module as claimed in claim 1, wherein at least sections of the module are double-bottomed.

5. Roof module as claimed claim 1, wherein the climate control system is operable as a heat pump.

6. Roof module as claimed in claim 1, wherein the climate control system is an electrically operated climate control system which is supplied with electrical power by the fuel cell system.

7. Roof module as claimed in claim 1, wherein heat generated by the fuel cell system is usable for heating of the motor vehicle.

8. Roof module as claimed in claim 1, wherein the fuel cell system is adapted for supplying power to at least the roof module in stationary operation.

9. Roof module according to claim 1, wherein the evaporator and an air circulating fan for said evaporator are shielded by said baffle with respect to air flowing from said air inlet to said air outlet.

* * * * *